United States Patent [19]

Kikuchi et al.

[11] Patent Number: 5,516,550
[45] Date of Patent: May 14, 1996

[54] METHOD FOR SURFACE TREATMENT OF SOLID PARTICLES AND APPARATUS THEREFOR

[75] Inventors: Yuji Kikuchi, Yokohama; Masamitsu Nagao, Yamato; Masaaki Takahashi, Sagamihara, all of Japan

[73] Assignee: Nara Machinery Co., Ltd., Tokyo, Japan

[21] Appl. No.: 302,081

[22] Filed: Sep. 7, 1994

Related U.S. Application Data

[63] Continuation of Ser. No. 13,345, Feb. 4, 1993, abandoned.

[30] Foreign Application Priority Data

Feb. 12, 1992 [JP] Japan .................. 4-059083

[51] Int. Cl.$^6$ ........................................ B05D 1/12
[52] U.S. Cl. .................. 427/180; 427/185; 427/201; 427/213
[58] Field of Search ................... 427/185, 180, 427/201, 213

[56] References Cited

U.S. PATENT DOCUMENTS 4,915,987  4/1990  Nara et al. .................. 427/213

FOREIGN PATENT DOCUMENTS 0005904  12/1979  European Pat. Off. .
0224659   6/1987  European Pat. Off. .
0438772A1  7/1991  European Pat. Off. .
3014952A1 10/1981  Germany .

*Primary Examiner*—Asok Pal
*Attorney, Agent, or Firm*—Nixon & Vanderhye

[57] ABSTRACT

A continuous method for the surface treatment of solid particles comprises feeding a powder mixture which consists of solid particles of a given substance and solid particles of another substance into one of a plurality of impact chambers in communication with one another and equipped with a rotating disc having impact pins and also with an impingement ring, subjecting the mixture to an impact striking action, separating an air stream produced by that action from the powder mixture and discharging it continuously from the impact chamber, repeating the impact action while allowing the powder mixture to reside temporarily in the impact chamber, and then causing the mixture to move, in succession, to the next chamber and so forth. An apparatus for the surface treatment comprises a plurality of rotating discs each fitted with a plurality of impact pins, a shaft on which the discs are fixedly mounted in spaced relationship, an impingement ring surrounding the discs to form an impact space, and partition plates disposed between the rotating discs to define a plurality of impact chambers, each partition plate being formed with a passageway close to the shaft to establish communication between the two adjacent impact chambers that it partitions.

3 Claims, 6 Drawing Sheets

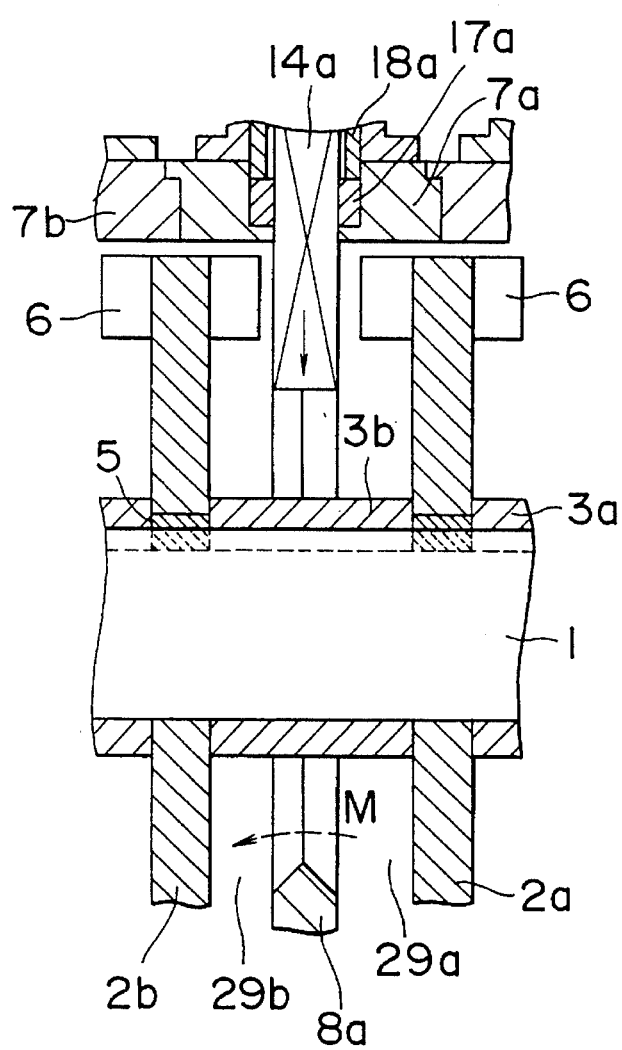
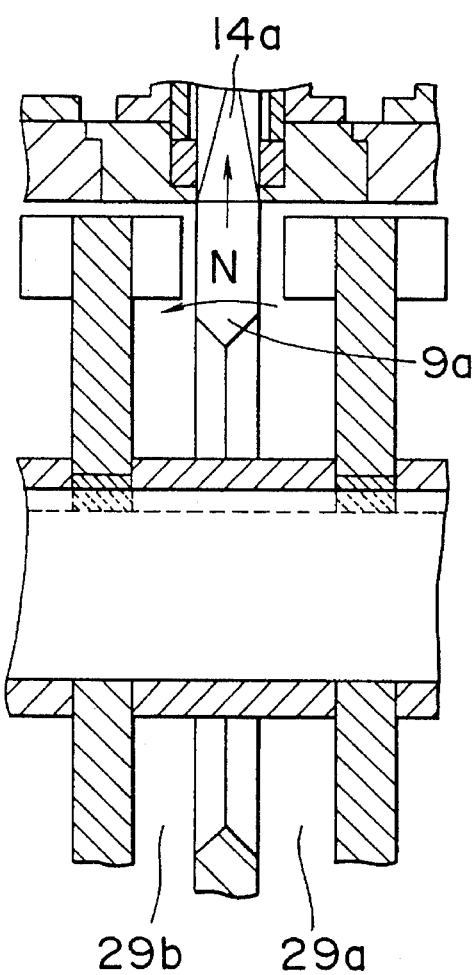
FIG. 4(a)
FIG. 4(b)

METHOD FOR SURFACE TREATMENT OF SOLID PARTICLES AND APPARATUS THEREFOR

This is a Rule 62 File Wrapper Continuation of application Ser. No. 08/013,345, filed Feb. 4, 1993, now abandoned.

FIELD OF THE INVENTION AND RELATED ART STATEMENT

The present invention relates to a method for the surface treatment of solid particles and an apparatus therefor. More particularly, the invention relates to a method and an apparatus for continuously performing the surface treatment of solid particles by either embedding finer particles of a different material in or depositing them on base particles. The invention further relates to a method of continuously performing the surface treatment of solid particles which comprises solidly depositing finer particles of another material on base particles and softening or melting a part or whole of the deposited particles so as to fix them in the form of a film onto the surfaces of the individual solid particles and relates also to an apparatus therefor.

Solid particles have hitherto been subjected to various surface treatments generally to avoid their caking, discoloration or changes of properties; improve their dispersibility, fluidity, catalytic effect, magnetic properties, and resistance to light; or to control digestion or absorption properties.

Broadly, surface treatments of solid particles can be classified into the following categories that depend on: (1) coating techniques; (2) topochemical processes, or scientific treatments using surface functional groups of particles; (3) mechano-chemical reactions that make the most of active sites formed on particle surfaces by mechanical action; (4) encapsulation; (5) high energies, e.g., ultraviolet rays, radiant rays, and plasma beam; and (6) precipitation reaction.

Useful among these methods is a technical variation of the encapsulation (4), known as "impingement in a high-speed air stream" (proposed, e.g., by Japanese Patent Application Disclosure No. SHO 62-83029). It is one way of obtaining a functional composite powder material by the surface treatment of given solid particles (hereinafter called "base particles"). The method fixes finer solid particles of a dissimilar substance (hereinafter called "sub-particles") onto the surfaces of the base particles.

To be more precise, the method uses an apparatus wherein a rotating disc fitted with hammer- or blade-type impact pins along the periphery thereof is disposed in an impact chamber and is surrounded by an impingement ring along the outermost circumferential track of the rotating disc with a given clearance therebetween. The method comprises conducting an air stream that has resulted from the revolution of the impact pins through a circulating passageway extending from a part of the impingement ring to a point close to the center of the rotating disc into the impact chamber and circulating the air stream therein, allowing the air stream to carry the total quantity of the powder mixture that consists of the base particles and sub-particles repeatedly through the impact chamber and the circulating passageway, and embedding the sub-particles in, or attaching them fast to, the surfaces of the base particles, while depositing, or after having deposited, the sub-particles thereon by the mechanical striking by the impact pins and also by the impact striking action of impingement against the impingement ring, whereby the surface treatment of the solid particles is accomplished. In this way the sub-particles are evenly distributed over the entire surfaces of the base particles and fixed solidly to the base. A functional composite powder material with stable properties can thus be produced efficiently within a very short period of time (e.g., of from several ten seconds to several minutes).

When solid particles are surface-treated in the foregoing manner, that is, when the sub-particles are embedded in or attached fast to the base particles, the sub-particles are harder than the base. Conversely when the base particles are harder and the sub-particles are, e.g., of a thermoplastic resin having a relatively low glass transition temperature of about 100° C., the sub-particles are bonded fast to the base particles by subjection to the impact striking action in the impact chamber. In addition, the thermal energy that is generated by successive impact strikes softens and melts the sub-particles at the instant of each impact striking action, until the adjoining sub-particles bonded to the individual base particles are wholly or partly fused together to form a film secured to the base particle surfaces.

The afore-described method of "impingement in a high-speed air stream" is a treatment performed completely batchwise, or in a batch system. Since the individual solid particles are evenly surface-treated throughout, a uniformly treated functional composite powder is obtained. However, the apparatus for surface treatment that involves the high-speed air stream impingement has to open or close various valves under timed control, at intervals of several minutes down to several ten seconds. Where auxiliary equipment installed before and after the apparatus are operated continuously, it has been necessary to provide temporary storage containers in between. Furthermore, each batch run has required metering and feeding a predetermined quantity of a powder mixture. The prior art apparatus thus has been complex and cumbersome to operate.

The powder mixture introduced into the apparatus develops heat as it is subjected to friction, impact, compression, and other actions. This increases the temperatures of not only the powder mixture (also called "feedstock" or "material" hereinafter) and the air stream (the atmosphere inside the apparatus) but also of the apparatus itself, including its rotating disc, impingement ring, and circulating passageway). Attempts have been made to lower the temperatures of the apparatus as well as of the atmosphere inside by the adoption of an impingement ring and circulating passageway of jacketed structure and passing a coolant through the jackets for cooling, or by jacketing the interior of the rotating disc and forming a coolant circuit in the jacket and then supplying a coolant through the shaft to the rotating disc so as to cool the disc and hence the apparatus itself as well as the atmosphere inside the apparatus. The attempts have had their limitations, however. In the batch treatment the temperature of the atmosphere inside the apparatus rises gradually after the introduction of a powder mixture. The temperature drops momentarily just after the surface-treated composite powder has been discharged following the conclusion of a bath operation. Nevertheless, repeated batch runs increase the temperature eventually, frequently beyond 100° C., within rather short time periods. In extreme cases the treatment has to be discontinued because of its adverse effects upon the physical properties of the particular powder mixture. The rise of temperature inside the apparatus is accompanied with an increase in the internal pressure, and this has necessitated the provision of equipment for venting the expanded gas. Further, because the feedstock is introduced instantly (in a matter of seconds), the load current value jumps momentarily. The rated current of the motor is often exceeded upon each batch feeding, therefore, even though the load current during the surface treatment can be kept below the rated current. Thus, difficulties have hitherto been involved in operating the apparatus while maintaining the temperatures and load current value within constant ranges.

OBJECT AND SUMMARY OF THE INVENTION

In view of the difficulties described above, the present invention has for its object to provide a method and an apparatus for continuously carrying out the surface treatment of solid particles by embedding finer solid particles of a dissimilar substance into the surfaces of the base solid particles, or attaching the finer particles fast to the latter, or fixing them in the form of a film over the individual base particles.

The afore-described difficulties are overcome in accordance with the present invention, in line with the above object, by a method for continuously surface-treating a powder mixture by continuously feeding the powder mixture which consists of solid particles and finer solid particles of a dissimilar substance into a surface-treating apparatus according to the invention. More particularly, the invention overcomes the difficulties of the prior art by feeding a powder mixture which consists of solid particles of a given substance and solid particles of another substance into one of a plurality of impact chambers in communication with one another and equipped with a rotating disc having impact pins and also with an impingement ring, subjecting the mixture to an impact striking action, separating an air stream produced by that action from the powder mixture and discharging it continuously from the impact chamber, repeating the impact action while allowing the powder mixture to reside temporarily in the impact chamber, and then causing the mixture to move, in succession, to the next chamber and so forth.

The present invention also eliminates those difficulties of the prior art by an apparatus comprising a plurality of rotating discs each fitted with a plurality of impact pins, a shaft on which the discs are fixedly mounted in spaced relationship, an impingement ring surrounding the discs to form an impact space, and partition plates disposed between the rotating discs to define a plurality of impact chambers, each partition plate being formed with a passageway close to the shaft to establish communication between the two adjacent impact chambers that it partitions.

BRIEF DESCRIPTION OF THE DRAWINGS

FIGS. 4(a) and (b) are fragmentary sectional views illustrating the operation of a stop valve, in the closed position and the open position, respectively;

DETAILED DESCRIPTION OF PREFERRED EMBODIMENTS

Typical base particle powders capable of being surface-treated in accordance with the present process are generally those having average particle diameters approximately between 0.1 and 100 µm. They include various synthetic resins and copolymer resins such as ABS, AS, MBS, polyamides, acrylics, epoxies, polyethylenes, polypropylenes, polyesters, polystyrenes, and vinyl chlorides; natural polymeric substances, such as starches and celluloses; natural and man-made waxes; inorganic substances, such as kaolin, calcium carbonate, calcium sulfate, alumina, silica (including glass beads), magnesia, calcia, iron oxide, zirconia, aluminum nitride, and silicon nitride; composite materials consisting of two or more such substances or consisting mainly of such a substance or substances; and many different metals.

Sub-particle powders usually desirable are those having a diameter not exceeding about one-tenth that of the particular base particles to be combined with, generally with an average particle diameter in the range of about 0.01 to about 10 µm. They are diverse synthetic resins and copolymer resins, such as ABS, AS, MBS, polyamides, acrylics, epoxies, polyethylenes, polypropylenes, polyesters, polystyrenes, and vinyl chlorides; various natural polymers; natural and man-made waxes; inorganic substances, such as graphite, carbon, titanium dioxide, mica, kaolin, calcium carbonate, calcium sulfate, alumina, silica (including glass beads), magnesia, calcia, iron oxide, zirconia, aluminum nitride, and silicon nitride; composite materials consisting of two or more such substances or consisting mainly of such a substance or substances; and metals, such as gold, silver, copper, iron, stainless steel, zinc, nickel, and aluminum. Where necessary, a plurality of the foregoing substances in any desired combination may be chosen as sub-particles.

The materials to be used are not limited to those referred to above. Also employable are numerous combinations of materials being used in various chemical, electrical, and other industries, including the fields of magnetic materials, paints, printing inks, toners, colorants, paper, textiles, pharmaceuticals, agricultural chemicals and pesticides, cosmetics, foods, rubbers, plastics, and ceramics.

Figure 1:
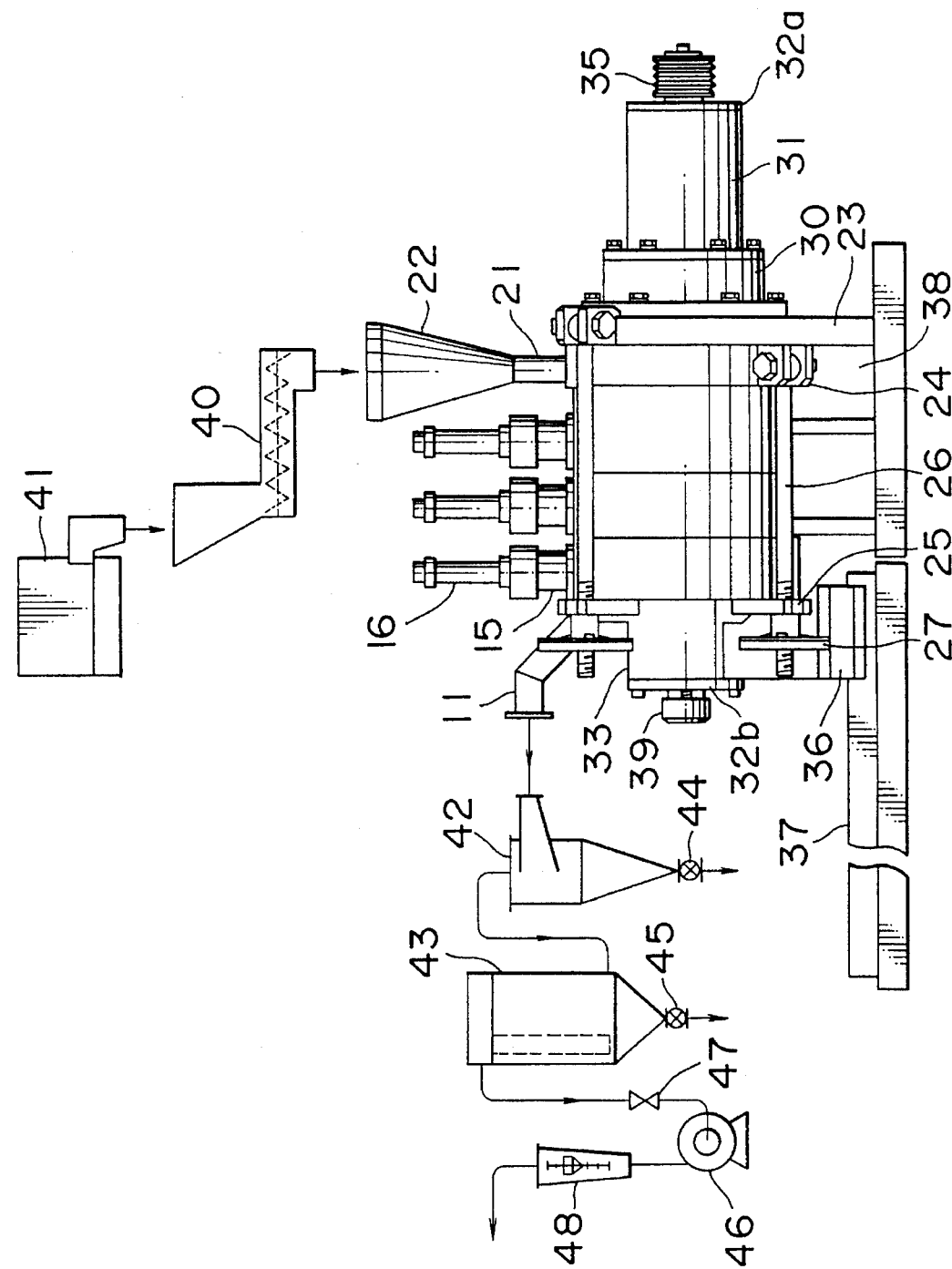
FIG. 1 is a schematic view of a powder-treating apparatus embodying the present invention, shown together with front and rear auxiliary units.
Figure 2:
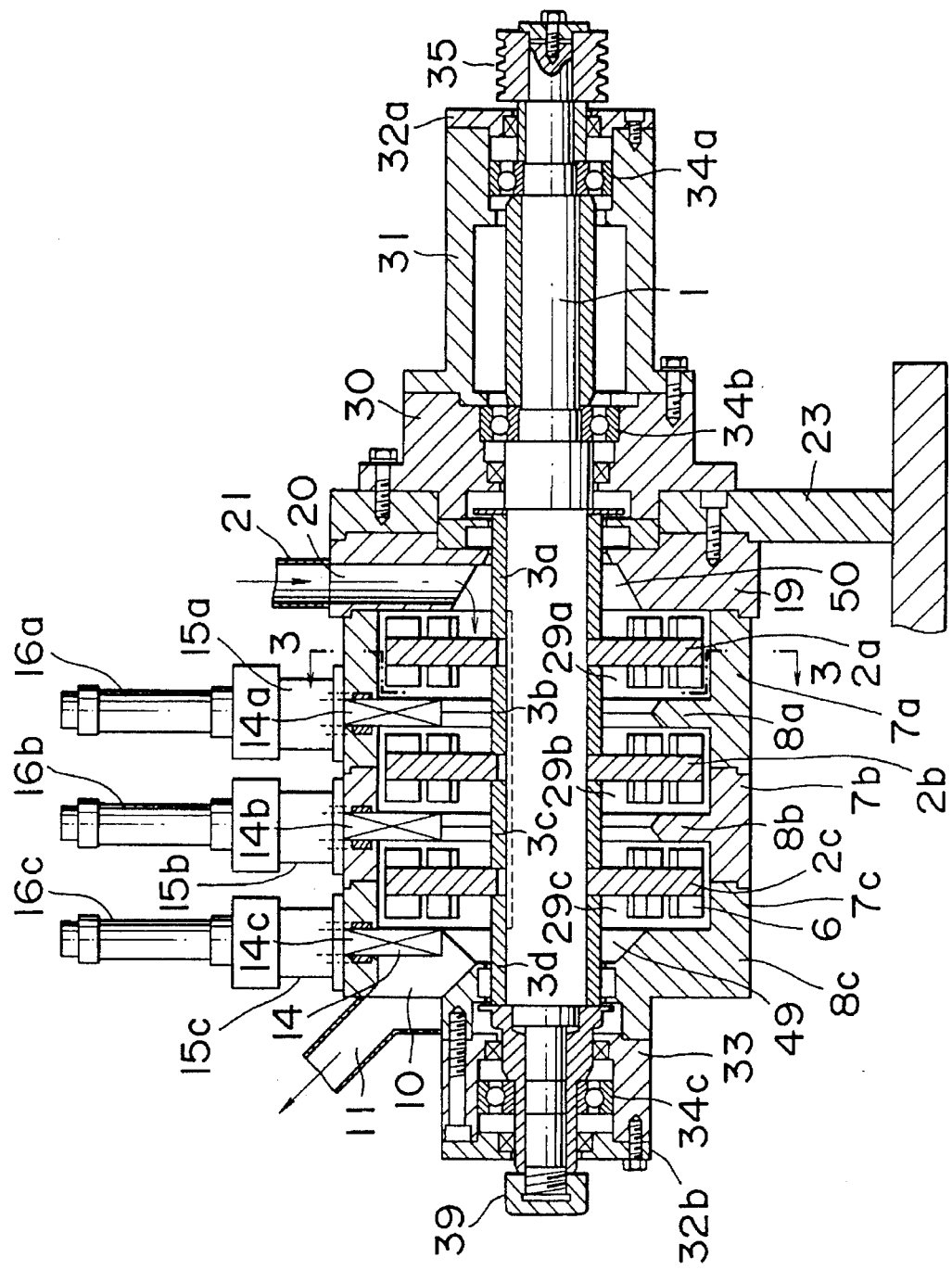
FIG. 2 is a vertical sectional view of the powder-treating apparatus of FIG. 1.
Figure 3:
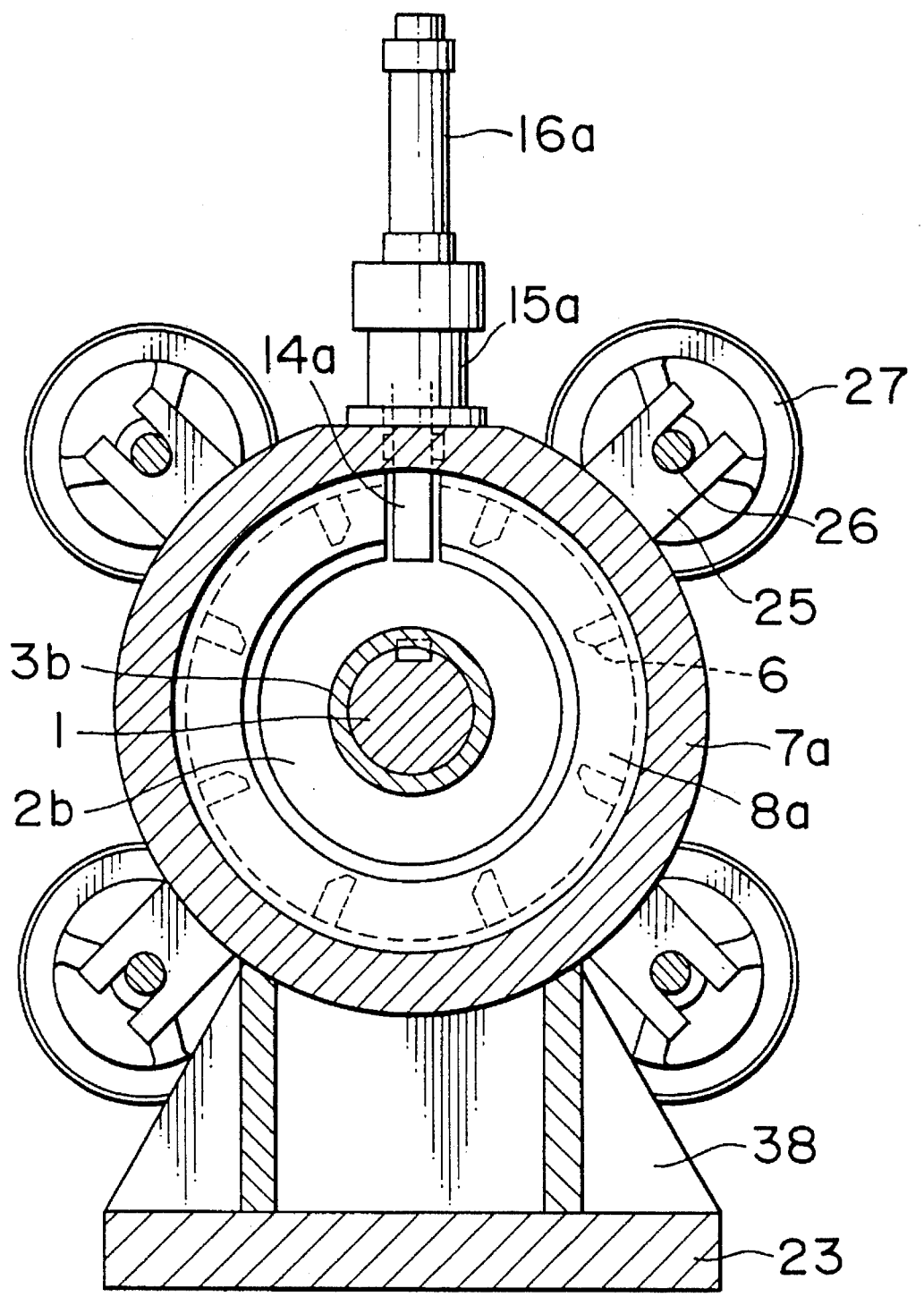
FIG. 3 is a sectional view taken on the line X—X of FIG. 2.

An embodiment of the present invention will now be described in detail with reference to the accompanying drawings. FIG. 1 is a front view of an embodiment of the powder-treating apparatus of the invention, shown together with front and rear auxiliary units; FIG. 2 is a vertical sectional view of the powder-treating apparatus shown in FIG. 1; FIG. 3 is a sectional view taken on the line X—X of FIG. 2; and FIGS. 4(a) and (b) are fragmentary sectional views illustrating the operation of stop valves.

Referring to the drawings, the numeral 1 designates a rotatable shaft extended through the apparatus, 2a, 2b, and 2c a plurality of rotating discs mounted on the shaft 1, and 3a, 3b, 3c, and 3d a plurality of collars located between the rotating discs or at the front or rear of the row of discs and loosely fitted on the shaft 1 so as to hold the discs in properly spaced relationship. Each rotating disc is fixedly secured to the shaft 1 with a key 5, as shown in FIG. 4(a). The disc itself carries on both sides and along the peripheries thereof a plurality of impact pins 6 radially at regular intervals. The impact pins 6 generally take the form of a blade or hammer each. Impingement rings, indicated at 7a, 7b, and 7c, are disposed along, with a given clearance from, the outermost circumferential track of the impact pins 6. In general, the clearance desirably ranges from 0.5 to 20 mm, although it varies to some extent with the size of the apparatus. The inner peripheral surfaces of the individual impingement rings 7 are either variously irregular or flat in shape. The rings alternately have a projection and a recess formed on the opposing end faces so that two adjacent rings are joined integrally as their projection and recess mate with each other.

There are disc-shaped partition plates 8a and 8b formed in one piece with the inner peripheral portions of the impingement rings 7a and 7b, respectively, between the discs 2a and 2b and between the discs 2b and 2c. These partition plates are hollow in the center, and the diameter of the center openings, as illustrated in FIGS. 2 and 4, is made smaller than the diameter of the innermost circular track of the impact pins 6 but larger than at least the outside diameter of the collars. The inner peripheral ends of the partition plates 8a, 8b defining the openings may be angularly shaped in cross section as shown.

The impingement ring 7c is formed in one piece with a disc-shaped member 8c, on the side (left as viewed in FIG. 2) opposite to the side facing the ring 7b. In addition to a center opening in which the collar 3d is loosely fitted, the disc-shaped member 8c has a substantially conical recess 49 flaring toward the center opening.

The partition plates 8a, 8b and the disc-shaped member 8c have radial openings extending from the outside of the impingement rings 7a, 7b, and 7c to the inside, and in those radial openings are securely fitted vertically shiftable stop valves 14a, 14b, and 14c. The stop valves 14a, 14b are built so that their inner ends can reach, respectively, the center openings of the partition plates 8a, 8b. The stop valve 14c is designed so that its inner end can reach the conical recess 49, and when the valve is lifted to the open position the recess left vacant is communicated with an outlet end 10 contiguous to a discharge duct 11.

Indicated at 15a is a holder retainer mounted on the outer side of the impingement ring 7a, and at 16a is an air cylinder for operating the stop valve 14a through the holder retainer 15a. 17a is a bush fitted in an annular recess of the radial opening of the impingement ring 7a to be in sliding contact with the stop valve 14a, and 18a is a spacer fitted immediately above the bush 17a (FIG. 4(a)). Other holder retainers 15b, 15c, air cylinders 16b, 16c, and their associated parts are made and mounted in like manner.

The numeral 19 denotes a bracket located on the right of the impingement ring 7a. The bracket 19 has a center opening in which the collar 3a of the shaft 1 is loosely fitted. It also has a substantially conical recess 50 similar to the recess 49 of the disc-shaped member 8c. The bracket 19 is formed with a material feed passageway 20 extending from the outside to the recess 50 in the vicinity of the axial center of the bracket. The feed passageway 20, in turn, is connected through a chute 21 with a material feed hopper 22. The end of the bracket 19 facing the impingement ring 7a has an annular projection mating with an annular recess of the ring.

The bracket 19, impingement rings 7a, 7b, 7c, and disc-shaped member 8c, in order of mention, are secured to one side of a casing 23 by a plurality of fastening means. The fastening means are comprised, as shown in FIG. 1, of hinge members 24 fixed to the casing 23, hinged bolts 26 turnably supported at one ends by the hinge members, holding members 25 (secured to the disc-shaped member 8c) engaged with the other ends of the hinged bolts 26, and handles 27 in thread engagement with the hinged bolts 26.

Impact chambers 29a, 29b, and 29c are thus formed by the bracket 19, impingement rings 7a, 7b, 7c, and disc-shaped member 8c and divided as such by the partition plates 8a, 8b and stop valves 14a, 14b, 14c.

In each impact chamber the clearances between the array of impact pins fitted along the periphery of each rotating disc and the partition plates are such that, as indicated in FIGS. 2 and 4, the clearance on the left is larger than that on the right. This arrangement is designed to force the air stream that results from the revolution of the impact pins from the right-hand side toward the left. To be more exact, it is intended to produce an air flow from the material feed passageway 20 (feed hopper 22) where the air is drawn by suction toward the outlet 10 from which it is discharged. In each chamber the air stream flows from the right side to the left while circulating along the inner, surrounding wall of the impingement ring, and through the space between the impact pins and the partition plate toward the center (shaft 1), and thence through the center opening of the partition plate toward the next impact chamber. With regard to the size of the impact pins, as viewed in these figures, the pins in the arrays on both sides of each rotating disc are equal in size or preferably the right hand pins are larger than those on the left. Larger impact pins on the right would produce more air stream on the right and would facilitate the leftward air flow.

To the right side of the casing 23 are secured a front cover 30, rear cover 31, and oil seal holder 32a, in succession, by fasteners such as bolts. Similarly, to the left side of the disc-shaped member 8c are fastened a bearing holder 33 and then an oil seal holder 32b by bolts or the like. The front cover 30, rear cover 31, and bearing holder 33 include bearings 34a, 34b, and 34c, respectively, to support the shaft 1 for smooth running.

On one end of the shaft 1 (at the right end as viewed in FIG. 1) is mounted a pulley 35, through which the power from a separate drive, e.g., a motor, is transmitted via V belt (not shown) to the shaft 1.

A slide unit 36 is fixed to the lower part of the bearing holder 33 so as to facilitate the overhauling and internal cleaning of this powder-treating apparatus, with rails 37 laid for the movement of the unit. A support structure 38 is formed integrally with the casing 23 to support the impingement rings when the powder-treating apparatus of the invention is disassembled or reassembled.

This apparatus is disassembled by first removing a nut 39 from the other end of the shaft 1 and then loosening the handles 27 and detaching the hinged bolts 26 from the holding members 25. Next, the slide unit 36 on the rails 37 is moved leftward as viewed in FIG. 1. This allows the disc-shaped member 8c, impingement ring 7c, bearing holder 33, and oil seal holder 32b to be easily separated altogether from the other components. Then, the rotating disc 2c, impingement ring 7b, and succeeding rotating discs and impingement rings can all be detached with ease.

The numeral 40 indicates a material metering feeder and 41 a preprocessor of a known type, such as one of various mixers, which is used when sub-particles must be deposited on base particles in advance. 42 is a cyclone, 43 a bag filter, 44, 45 rotary valves, 46 an exhaust blower, 47 a valve for controlling the quantity of air to be drawn by suction, and 48 a flow meter.

The impingement rings, when required, may be furnished with jackets (not shown) through which cooling water (or warm water or hot steam) can be circulated.

When the air being supplied to the apparatus must be cooled (or heated), it is possible to introduce a low-temperature gas, prepared by vaporizing a coolant such as liquid nitrogen, through the material feed chute 21 or install a hot air generator midway the chute (although neither arrangement is shown).

Where the surface treatment according to the present invention has to be carried out in an inert gas atmosphere, nitrogen or other inert gas may be supplied through the chute 21. In such a case, however, the material metering feeder 40 and feed hopper should be directly connected (in a manner not shown) to minimize the intrusion of external air into the hopper 22.

The apparatus is operated in the following way.

First, the air cylinders are actuated to force the stop valves downward to choke the radial openings of the partition plates 8a, 8b, and the disc-shaped member 8c in a completely closed state (FIG. 4(a)). Next, the shaft 1 is driven so that the rotating discs run, with the impact pins 6 at the outer peripheral speed of 100 m/sec. The exhaust blower 46 too is driven to draw by suction the air stream produced by the revolution of the impact pins 6 or a slightly more volume of air from the individual impact chambers. The quantity of air to be sucked out may be controlled by manipulating the valve 47 while watching the flow meter 48. As the air is drawn in by suction from the material feed hopper 22, the material is carried by the air stream first into the impact chamber 29a via the feed chute 21 and the feed passageway 20. The material passes through the center opening of the partition plate 8a into the next impact chamber 29b (as indicated by an arrowed broken line M in FIG. 4(a)). It further moves through the center opening of the partition plate 8b into the impact chamber 29c and thence through the substantially conical recess 49 of the disc-shaped member 8c, the outlet 10, discharge duct 11, cyclone 42, bag filter 43, and is finally discharged from the system by the exhaust blower 46.

The outer peripheral speed of the impact pins 6 desirably ranges from 30 to 150 m/sec. If the speed is lower than 30 m/sec the pins are unable to give adequate impact force to the powder mixture and the treatment is time-consuming and inefficient. A speed higher than 150 m/sec, on the other hand, is difficult to attain mechanically. Actually, even in the speed range specified above, the pins can sometimes grind up the particles that are to be surface-treated by the method of the invention, depending on the size, physical properties, or other factors of the base particles. In that case it is advisable to choose a range at which the base particles are not ground up, or an optimum outer peripheral speed at which the grinding is restricted to a minimum. Also, when realizing a fixed state as desired, or when fixing sub-particles onto base particles, the outer peripheral speed and the time period of residence inside the apparatus must be varied even for the same combination of base and sub-particles, depending on the particular conditions including whether the sub-particles are to be embedded completely or about half in the base particles.

Either a powder mixture composed of base particles and smaller sub-particles or an ordered mixture of particles composed of base particles and sub-particles deposited on the base in advance by the preprocessor 41 is continuously supplied from the material metering feeder 40 to the feed hopper 22. The feedstock is then fed from the hopper 22 to the impact chamber 29a through the feed chute 21 and the passageway 20. The feeding is accomplished rapidly as the powder mixture is entrained by the air stream. Inside the chamber 29a the powder mixture is subjected to instantaneous mechanical striking by the number of impact pins 6 on the rotating disc 2a that is running at a high speed and is forced against the surrounding wall of the impingement ring 7a. As noted above, the air stream passes in a one-way flow through the successive impact chambers and is discharged from the system. The powder mixture under the influence of centrifugal force is separated from the air stream and retained in the impact chamber 29a, where it continues to be subjected to repeated mechanical striking action of the impact pins and collision against the impingement ring. Since the powder mixture is continuously fed from the hopper 22, it gradually accumulates in the impact chamber 29a and is repeatedly struck while the revolving impact pins cause it to circulate along the inner peripheral surface of the impingement ring 7a.

After the lapse of a given period of time, the air cylinder 16a is actuated to raise the stop valve 14a until the bottom of the valve is flush with the inner peripheral surface of the impingement ring 7a, where the radial opening 9a of the partition plate 8a is completely opened (FIG. 4(b)). This allows the powder mixture retained in the impact chamber 29a to move instantly in the direction of the arrow N through the radial opening 9a into the next impact chamber 29b. Here again the mixture is subjected to repeated striking action by the impact pins 6 and the surrounding wall of the impingement ring 7b. After the powder mixture has moved to the impact chamber 29b, the stop valve 14a is closed and a fresh supply of powder mixture is allowed to gather in the impact chamber 29a and is subjected to the impact striking action of the impact pins 6 and the surrounding impingement ring 7a.

After the lapse of another given period, the stop valve 14b is opened, allowing the powder mixture to move instantly from the impact chamber 29b to the next chamber 29c, where it is again struck repeatedly in like manner. The stop valve 14b is closed, followed by the opening of the stop valve 14a, which causes the powder mixture to move likewise from the impact chamber 29a to the chamber 29b. After another time period, the stop valve 14c is opened and the powder mixture is led out of the impact chamber 29c and guided through the outlet 10 of the surface-treated particles and discharge duct 11 to collectors such as the cyclone 42 and bag filter 43, where it is collected.

Figure 5:
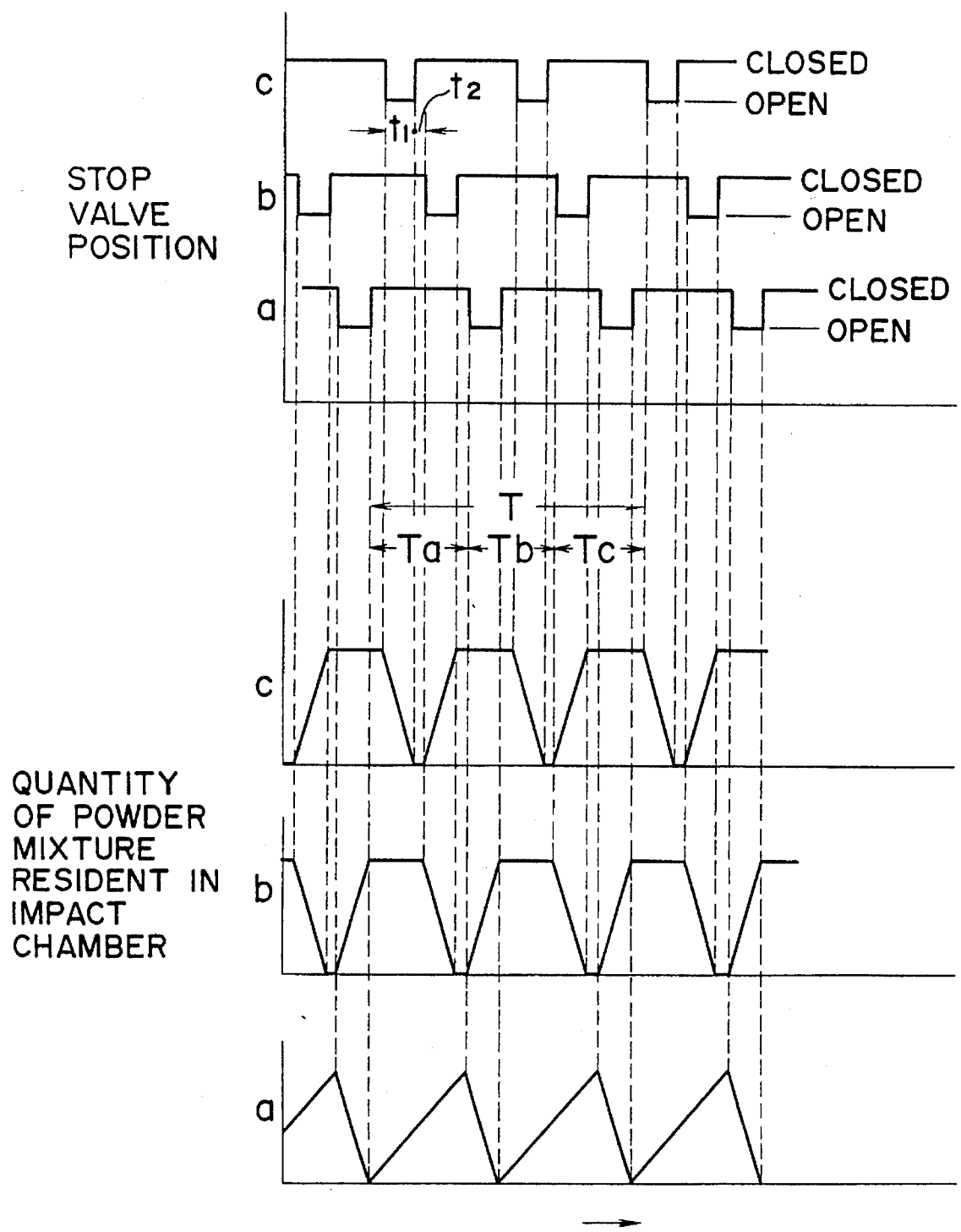
FIG. 5 is a graphic representation of a typical relationship between the open and closed positions of individual stop valves and the quantities of powder mixture resident in individual impact chambers.

FIG. 5 is a graphic representation of typical relationship between the positions of individual stop valves and the quantities of powder mixture retained in the respective impact chambers. In the graph the symbols Ta, Tb, Tc signify the residence time periods of the powder mixture in the impact chambers 29a, 29b, 29c, respectively, and T signifies the total residence time, or the time required for the surface treatment. The symbol $t_1$ denotes the duration of each stop valve opening, and $t_2$ the time interval, e.g., between the closing of the stop valve 14b and the opening of the valve 14a. The relation between $t_1$ and $t_2$ is $t_1 > t_2 \geqq 0$, and the duration $t_1$ may be on the order of several seconds.

The apparatus according to the invention may be furnished with several different impingement rings, in place of the same rings as described above, with partition plates varying in the diameter of the central opening. Also, the apparatus may be operated with all the stop valves normally closed, depending on the types of the powder materials to be composited. In the latter the powder mixture resident in the first impact chamber accumulates to a given quantity of residence, when it begins to overflow continuously beyond the center opening of the partition plate into the next impact chamber and thence into the ensuing chamber until it is continuously discharged from the outlet.

In that event the residence time of the powder mixture can be controlled through the supply (feed rate) of the powder mixture, blower's suction air quantity, etc.

Figure 6:
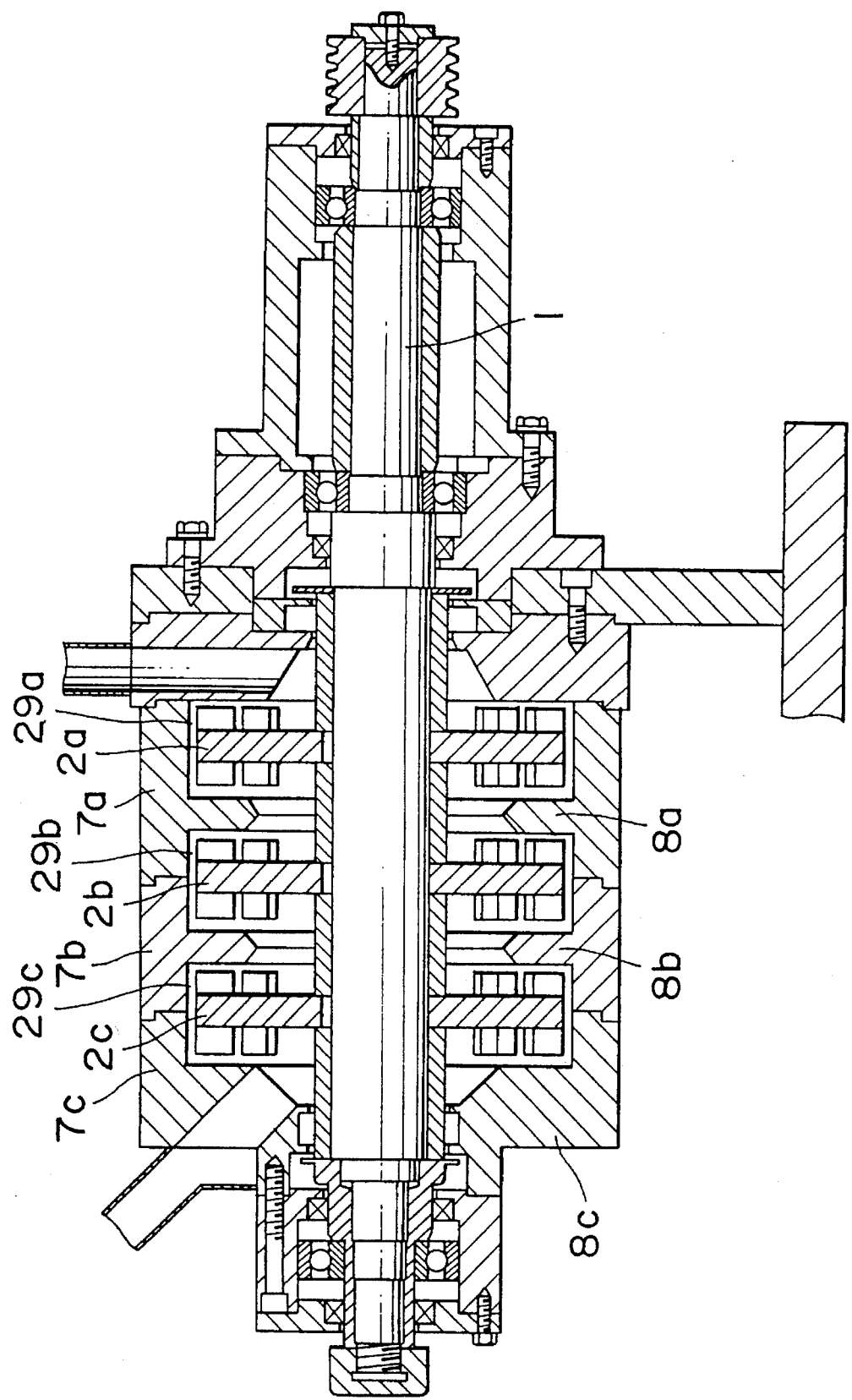
FIG. 6 is a vertical sectional view of another embodiment of the powder-treating apparatus of the invention.

FIG. 6 is a vertical sectional view of another embodiment of the powder-treating apparatus of the invention. This apparatus does not use partition plates having a radial opening, that is, possesses no stop valve or air cylinder to drive it. The remainder of construction is the same as that of the embodiment described above. The flow of the feedstock in this apparatus corresponds to that in the preceding apparatus when operated with all the stop valves kept closed. As it gathers to a given amount, the powder mixture resident in an impact chamber overflows continuously into the next chamber through the center opening of the partition plate and thence into another chamber, until it is continuously discharged from the outlet.

Surface treatment was performed in conformity with the method of the invention using a powder-treating apparatus of the invention which comprised three grinding chambers, rotating discs 230 mm in diameter and each having a set of eight impact pins on each side, with the clearance between the outermost circumferential track of the impact pins and the surrounding wall of the impingement rings being 5 mm. Some examples of the treatment will now be explained.

EXAMPLE 1

An ordered mixture consisting of polyethylene particles 12 μm in average particle diameter and fine titanium oxide particles having an average particle diameter of 0.3 μm and deposited on the polyethylene particles (the polyethylene:titanium oxide mixing ratio=4:1) was continuously fed to the above-mentioned powder-treating apparatus to obtain composite particles as Sample Nos. 1 to 3. The samples and other conditions used are shown in Table 1. In the table the term "pin outer peripheral speed" is used to mean the speed of the impact pins in revolution along their outermost circumferential track, and by "residence time" is meant the period of time in which the powder mixture is resident in each impact chamber. The latter signifies that, as indicated in FIG. 5, each stop valve was kept opened for each residence time. The time period $t_1$ for which the stop valve was open was five seconds. The term "total residence time" refers to the length of time from the introduction of the powder mixture into the powder-treating apparatus till the discharge of the product. In other words, it is the time period required for the surface treatment. Strictly speaking, however, the average residence time of the powder mixture in the impact chamber a is a half of the numerical value given in the table, and that much time must be deducted from the "total residence time".

TABLE 1

| No. | Rotating disc speed, rpm | Pin outer peripheral speed, m/sec | Suction air quantity, m³/min. | Material feed rate, g/min | Residence time, min | Total residence time, min | Temp. in apparatus (20 min later), °C. |
|---|---|---|---|---|---|---|---|
| 1 | 6400 | 77 | 0.15 | 50 | 80 | 4 | 36 |
| 2 | 6400 | 77 | 0.3 | 50 | 60 | 3 | 34 |
| 3 | 6400 | 77 | 0.3 | 50 | 40 | 2 | 33 |

Table 1 gives the temperatures inside the apparatus 20 minutes after the start of the test runs. In all runs the temperatures were approximately 35° C. (the temperatures at the start being about 25° C., the same applying to the examples that follow), and the subsequent temperature rise was little if any.

Observation under a scanning electron microscope (SEM) revealed that all the samples thus treated were composite particles consisting of the fine titanium dioxide particles evenly embedded in the entire surfaces of the polyethylene particles.

EXAMPLE 2

An ordered mixture consisting of potato starch particles 46 μm in average particle diameter and fine polymethyl methacrylate (PMMA) particles having an average particle diameter of 0.4 μm and deposited on the starch particles (the potato starch:PMMA mixing ratio=19:1) was continuously fed to the above-mentioned powder-treating apparatus to obtain composite particles as Sample Nos. 1 and 2. The samples and other conditions used are shown in Table 2.

TABLE 2

| No. | Rotating disc speed, rpm | Pin outer peripheral speed, m/sec | Suction air quantity, m³/min. | Material feed rate, g/min | Residence time, min | Total residence time, min | Temp. in apparatus (20 min later), °C. |
|---|---|---|---|---|---|---|---|
| 1 | 6400 | 77 | 0.3 | 75 | 40 | 2 | 36 |
| 2 | 6400 | 77 | 0.3 | 37.5 | 80 | 4 | 38 |

In either case the temperature inside the apparatus 20 minutes after the start of operation was short of 40° C., and the subsequent temperature rise was little as observed in Example 1.

It was found by SEM observation that both samples were in the form of composite particles, with PMMA evenly fixed (forming a film) onto the potato starch particles.

EXAMPLE 3

An ordered mixture consisting of polystyrene particles 12 μm in average particle diameter and ultramicroscopic aerosol particles having an average particle diameter of 0.012 μm and deposited on the polystyrene particles (the polystyrene:aerosil particle mixing ratio=99:1) was continuously fed to the above-mentioned powder-treating apparatus to obtain composite particles. The samples and other conditions used are shown in Table 3. For this example the powder-treating apparatus not equipped with stop valves, as shown in FIG. 6, was used.

TABLE 3

| No. | Rotating disc speed, rpm | Pin outer peripheral speed, m/sec | Suction air quantity, m³/min | Material feed rate, g/min | Total residence time, min | Temp. in apparatus (20 min later), °C. |
|---|---|---|---|---|---|---|
| 1 | 4800 | 58 | 0.3 | 100 | 1 | 33 |
| 2 | 4800 | 58 | 0.3 | 200 | 0.5 | 32 |

As Table 3 indicates, the temperature inside the apparatus 20 minutes after the start of operation was short of 35° C., and the subsequent temperature rise was negligible. This is ascribable to the lower outer peripheral speed of the pins and the shorter residence of the powder mixture inside the apparatus than in the preceding examples.

SEM observation revealed that both samples were in the form of composite particles, with the very fine aerosil particles properly embedded in the almost entire surfaces of the polystyrene particles.

As has been described in detail, the method and the apparatus of the present invention makes it possible to carry out continuously the surface treatment of solid particles by securely embedding finer solid particles of a dissimilar substance in, or depositing or forming a film of the finer particles on, the base particles.

The continuous operation permits stable surface treatment of the solid particles with a load current maintained within a predetermined range, while the temperature of the atmosphere inside the apparatus is kept in a low range.

The operation is easier than when treating the material in batches.

The composite particles obtained in conformity with the present method are favorably comparable to those obtained by batch treatment.

We claim:

1. A method of continuous surface treatment of solid particles of one substance by fixing particles of another substance on the surface of said one substance particles in a series of adjacent impact chambers, a first impact chamber including a particle inlet and a last impact chamber including a particle exit, each impact chamber including a rotating disk with a plurality of impact pins located on said disk, an impact ring located at a periphery of the rotating disk and a partition plate separating each impact chamber from an adjacent impact chamber, said plate including a center opening and a radial opening, said plate including a stop valve moveable over said radial opening between closed and opened positions and the rotation of said disks in said chambers causing an airflow through said center opening of said partition plate from said particle inlet to said particle exit, said method comprising the steps of:

(a) closing said radial openings of said partition plates separating said impact chambers by said stop valve;

(b) continuously adding a mixture of said one substance particles and said another substance particles to said first impact chamber:

(c) rotating said impact disks in each chamber at a rotational rate so as to cause said another substance particles to at least partially adhere through impact to the surface of said one substance particles;

(d) temporarily opening said stop valve covering said radial opening of said partition plates permitting said mixture to move from said first chamber into a second impact chamber adjacent said first chamber;

(e) repeating steps (a) through (d) until said mixture first introduced into the first impact chamber is discharged from said last impact chamber with said another substance particles fully fixed to said surface of said one substance particles.

2. The method as claimed in claim 1, wherein said one substance particles and said another substance particles are dissimilar substances and the another substance particles are embedded in or fixed to the surfaces of the one substance particles while being adhered or after having been adhered thereto.

3. The method as claimed in claim 1, wherein one substance particles and said another substance particles are dissimilar substances and, while the another substance particles are being adhered or after having been adhered to the one substance particles, the impact striking action is repeated so that the generated thermal energy softens and melts at least a portion of the adjacent another substance particles on the individual one substance particles to fuse together and form a film sticking fast to the one substance particles.

* * * * *